(12) United States Patent
Lin et al.

(10) Patent No.: US 10,928,254 B2
(45) Date of Patent: Feb. 23, 2021

(54) PROBE COVER FOR EAR THERMOMETER

(71) Applicant: RADIANT INNOVATION INC., Hsinchu (TW)

(72) Inventors: Tseng-Lung Lin, Hsinchu (TW); Chin-Hui Ku, Hsinchu (TW)

(73) Assignee: RADIANT INNOVATION INC., Hsinchu (TW)

(*) Notice: Subject to any disclaimer, the term of this patent is extended or adjusted under 35 U.S.C. 154(b) by 260 days.

(21) Appl. No.: 16/153,155

(22) Filed: Oct. 5, 2018

(65) Prior Publication Data

US 2020/0109993 A1 Apr. 9, 2020

(51) Int. Cl.
*G01K 1/08* (2021.01)
*G01J 5/02* (2006.01)
*G01J 5/04* (2006.01)

(52) U.S. Cl.
CPC .............. *G01K 1/086* (2013.01); *G01J 5/021* (2013.01); *G01J 5/049* (2013.01)

(58) Field of Classification Search
CPC .......... G01J 5/021; G01J 5/049; G01J 5/0011; G01K 1/086
See application file for complete search history.

(56) References Cited

U.S. PATENT DOCUMENTS

| | | | | |
|---|---|---|---|---|
| 4,159,766 A * | 7/1979 | Kluge | ................... | G01K 1/083 374/209 |
| 5,906,437 A * | 5/1999 | Lin | .................. | G01J 5/021 374/158 |
| 6,139,182 A * | 10/2000 | Levatter | .................... | G01J 5/02 374/158 |
| 8,876,373 B2 * | 11/2014 | Lane | .................. | G01J 5/0011 374/158 |
| 9,357,930 B2 * | 6/2016 | Quinn | .................. | A61B 5/01 |
| 10,184,842 B2 * | 1/2019 | Lane | .................. | G01J 5/021 |
| 2001/0014112 A1 * | 8/2001 | Yamaka | .................. | G01J 5/04 374/158 |
| 2001/0017880 A1 * | 8/2001 | Beerwerth | ............. | G01J 5/049 374/158 |
| 2006/0165152 A1 * | 7/2006 | Walker | .................. | G01J 5/021 374/158 |
| 2009/0122836 A1 * | 5/2009 | Li | ......................... | G01J 5/021 374/209 |
| 2009/0129437 A1 * | 5/2009 | Chuang | .................. | G01J 5/02 374/158 |
| 2012/0027047 A1 * | 2/2012 | Lane | .................. | G01J 5/0011 374/209 |

(Continued)

*Primary Examiner* — Nathaniel T Woodward
*Assistant Examiner* — Philip L Cotey
(74) *Attorney, Agent, or Firm* — Li & Cai Intellectual Property (USA) Office

(57) ABSTRACT

A probe cover for an ear thermometer includes a conical main body, an annular elastomer, a flange and a plurality of convex rib structures. The conical main body includes a closed end and an open end. The annular elastomer is connected with the open end of the conical main body. The flange is connected with the annular elastomer. The annular elastomer is arranged between the conical main body and the flange. The flange has a first surface and a second surface. The convex rib structures are disposed on the flange and spaced apart from each other, and the concave rib structures protrude upwardly from the first surface.

18 Claims, 19 Drawing Sheets

(56) References Cited

U.S. PATENT DOCUMENTS

| | | | |
|---|---|---|---|
| 2012/0076169 A1* | 3/2012 | Hsieh | G01J 5/021 |
| | | | 374/158 |
| 2013/0245488 A1* | 9/2013 | Quinn | A61B 5/01 |
| | | | 600/549 |
| 2014/0119406 A1* | 5/2014 | Chen | G01K 1/086 |
| | | | 374/209 |
| 2018/0100770 A1* | 4/2018 | Lane | G01K 1/086 |

* cited by examiner

PROBE COVER FOR EAR THERMOMETER

FIELD OF THE DISCLOSURE

The present disclosure relates to a probe cover for an ear thermometer, and more particularly to a probe cover for a probe of an ear thermometer.

BACKGROUND OF THE DISCLOSURE

The ear thermometer gun or the forehead thermometer gun can be used to measure the body temperature. For health and safety considerations, a disposable thermometer sheath will be sleeved on the probe of an ear thermometer before measuring a temperature. However, the structure of the conventional thermometer sheath is used to engage with the probe of the ear thermometer, which may cause a low yield rate during the manufacturing process. In addition, due to the weak strength of the conventional thermometer sheath, the conventional thermometer sheath can be difficult to assemble on or detach from the probe during use.

In view of the above reasons, how the thermometer sheath can be easily assembled on or detached from the probe by improvement of the structural design has become an issue to be solved.

SUMMARY OF THE DISCLOSURE

In response to the above-referenced technical inadequacies, the present disclosure provides a probe cover for an ear thermometer to improve the convenience of assembly/disassembly.

In one of certain aspects, the present disclosure provides a probe cover for an ear thermometer including a conical main body, an annular elastomer, a flange, and a plurality of convex rib structures. The conical main body includes a closed end and an open end corresponding to the closed end. The annular elastomer is connected to the open end of the conical main body. The flange is connected to the annular elastomer, and the annular elastomer is arranged between the conical main body and the flange. In addition, the flange has a first surface and a second surface opposite to the first surface. The convex rib structures are disposed on the flange and spaced apart from each other, and the convex rib structures protrude upwardly from the first surface.

Therefore, the strength of the probe cover can be improved to be easily engaged on or be detached from the probe by the features of "the convex rib structures are disposed on the flange and spaced apart from each other, and the convex rib structures protrude upwardly from the first surface".

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

Figure 1:
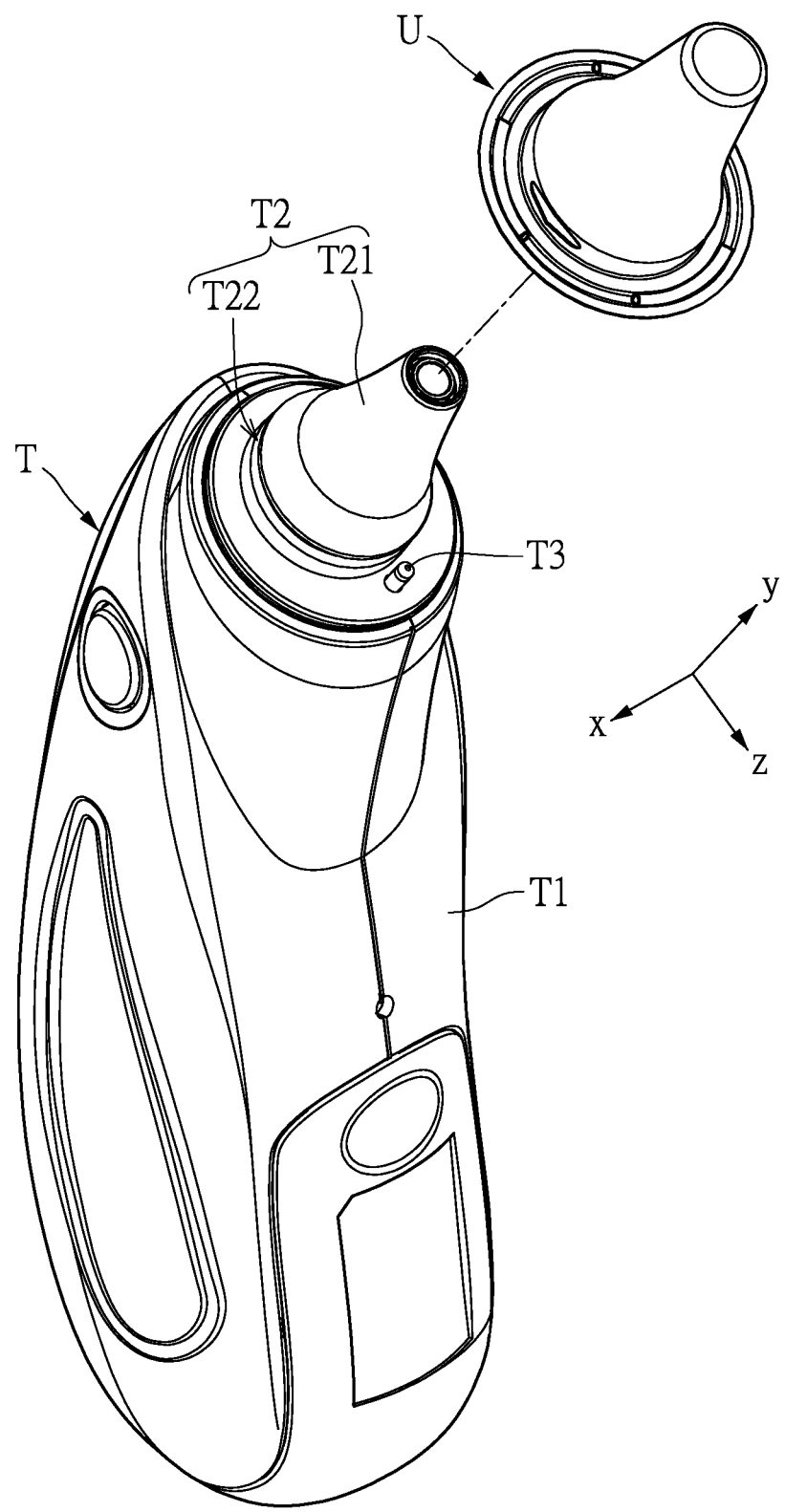
FIG. 1 is an exploded view of a probe cover for an ear thermometer and an ear thermometer according to a first embodiment of the present disclosure.

The present disclosure is more particularly described in the following exemplary embodiments that are intended as illustrative only since numerous modifications and variations therein will be apparent to those skilled in the art. Referring to the drawings, like numbers, if any, indicate like components throughout the views. In the description herein and throughout the claims that follow, the meaning of "a", "an", and "the" includes plural reference unless the context clearly dictates otherwise, and the meaning of "in" includes "in" and "on" unless the context clearly dictates otherwise. Moreover, titles or subtitles may be used in the specification for the convenience of a reader, which shall have no influence on the scope of the present disclosure.

The terms used in this specification generally have their ordinary meanings in the art, within the context of the disclosure, and in the specific context where each term is used. Certain terms that are used to describe the disclosure are discussed in the specification to provide additional guidance to the practitioner regarding the description of the disclosure. For convenience, certain terms may be highlighted, for example using italics and/or quotation marks, but should not affect the scope and meaning of the terms under the same context. Alternative language and synonyms may be used for any one or more of the terms discussed herein, and no special significance is to be placed upon whether or not a term is elaborated or discussed herein. One or more synonyms for certain terms may be provided, but do not exclude the use of other synonyms. The use of examples anywhere in this specification is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

While numbering terms such as "first", "second" or "third" may be used in this disclosure to describe various components, signal or the like, the terms are for distinguishing one component from another component, or one signal from another signal only, and are not intended to, nor should they be construed to impose any other substantive descriptive limitations on the components, signals or the like.

First Embodiment

Figure 2:
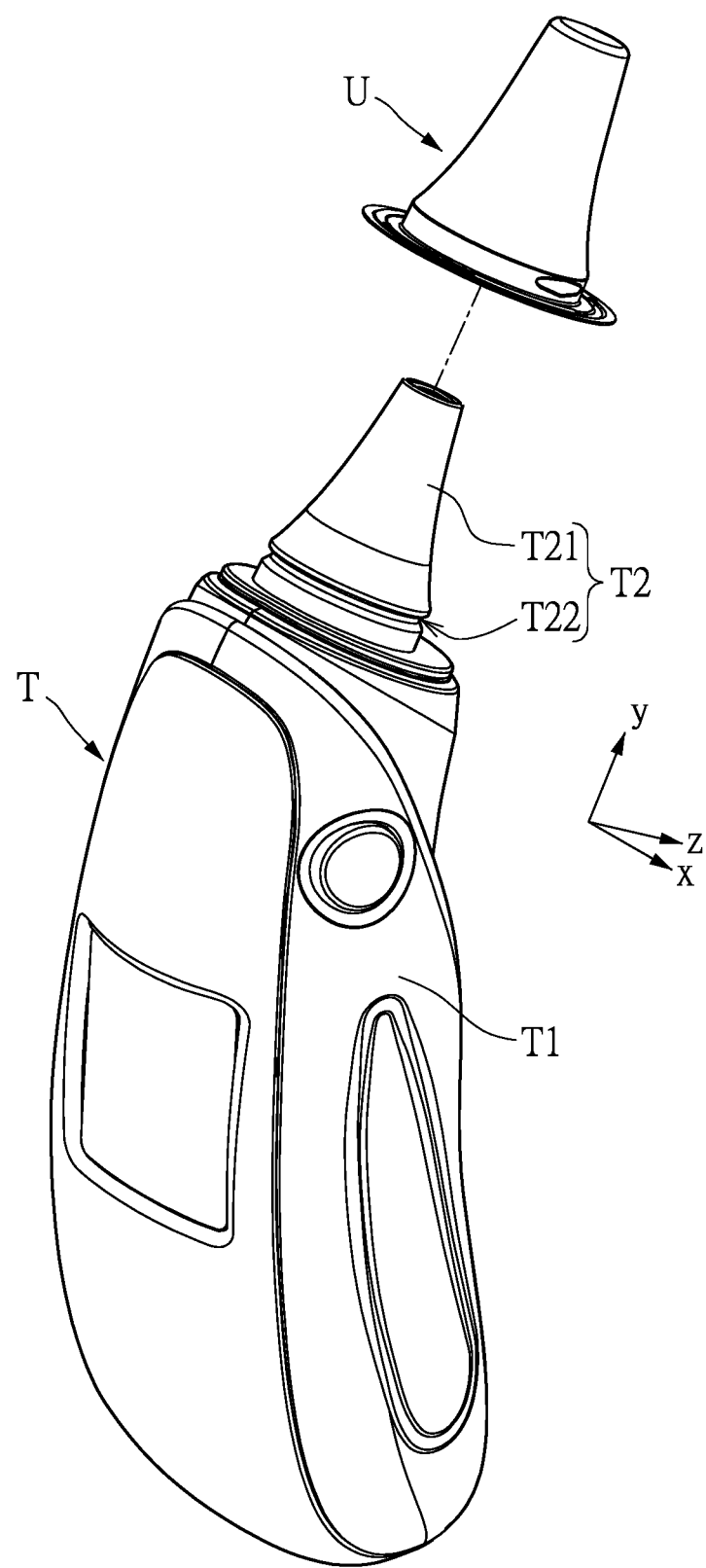
FIG. 2 is another exploded view of the probe cover for an ear thermometer and the ear thermometer according to the first embodiment of the present disclosure.

Firstly, reference is made to FIG. 1 and FIG. 2, which are exploded views of a probe cover for an ear thermometer and an ear thermometer according to a first embodiment of the present disclosure. The first embodiment of the present disclosure provides a probe cover U for an ear thermometer T to engage the probe T2 of the ear thermometer T. In other words, the probe cover U is a thermometer sheath. Further, the ear thermometer T includes a thermometer main body T1, and a probe T2 disposed on the thermometer main body T1. In addition, the probe T2 has an external surface T21 and a groove T22 formed on the external surface T21. The probe cover U in this embodiment of the present disclosure can be engaged (or fastened) with the groove T22 of the external surface T1, so as to dispose the probe cover U on the ear thermometer T. It is worth mentioning that, the probe cover U in this embodiment of the present disclosure may be hard thermometer sheath that is integrally formed. It should be noted that, the actual structure of the thermometer main body T1 is well known in the art, and will not be reiterated herein.

Figure 3:
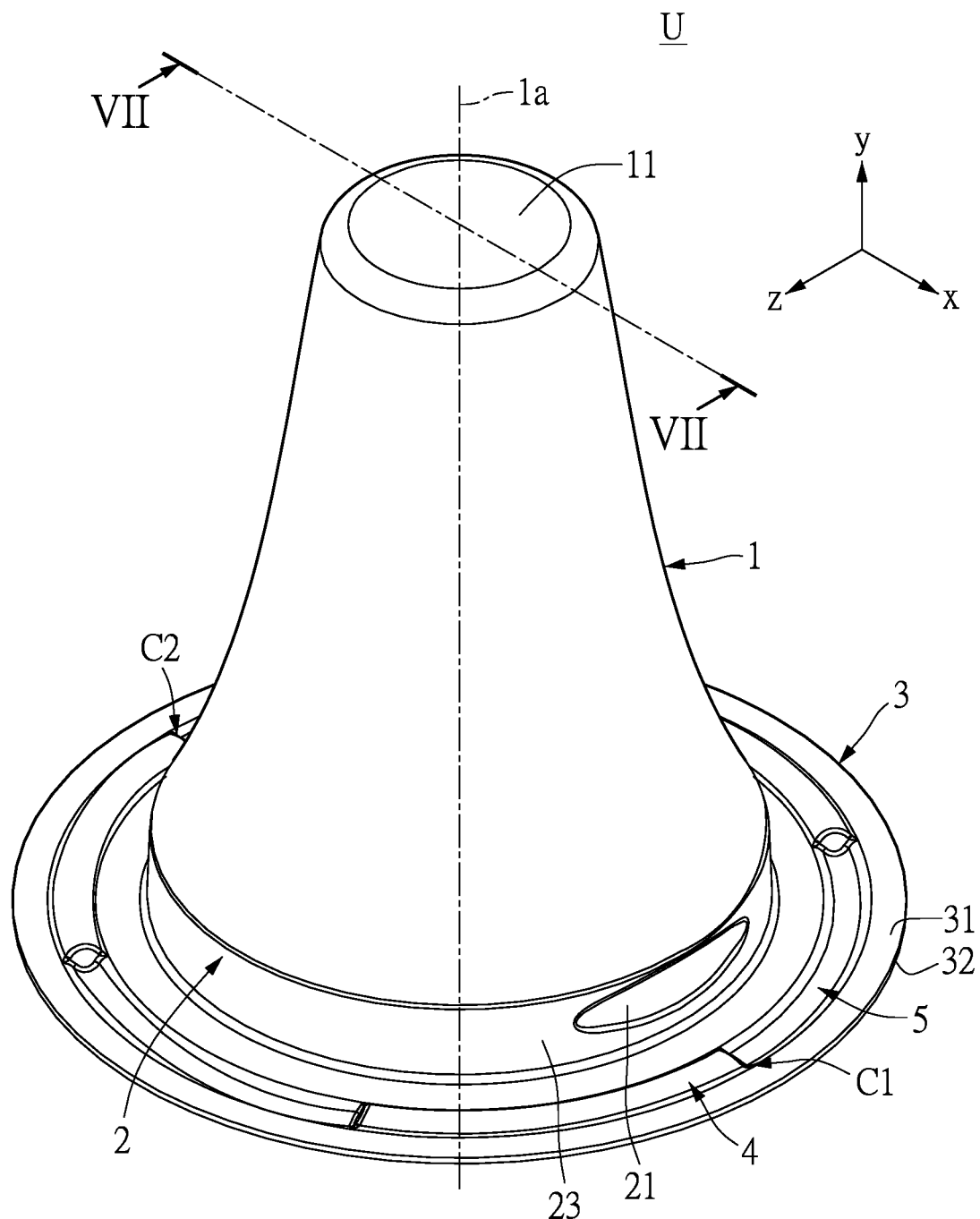
FIG. 3 is a schematic view of the probe cover for an ear thermometer according to the first embodiment of the present disclosure.
Figure 4:
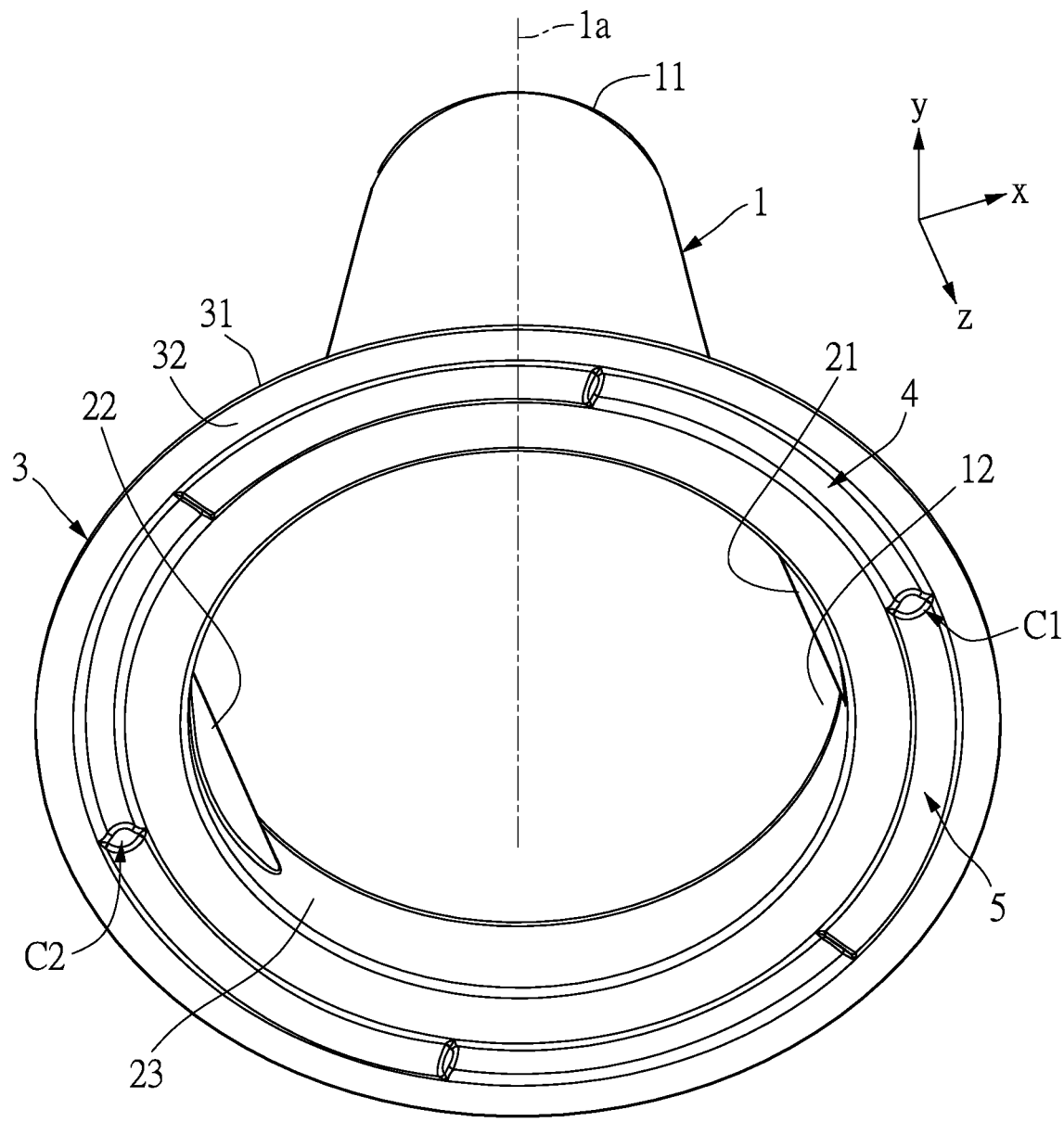
FIG. 4 is another schematic view of the probe cover for an ear thermometer according to the first embodiment of the present disclosure.
Figure 5:
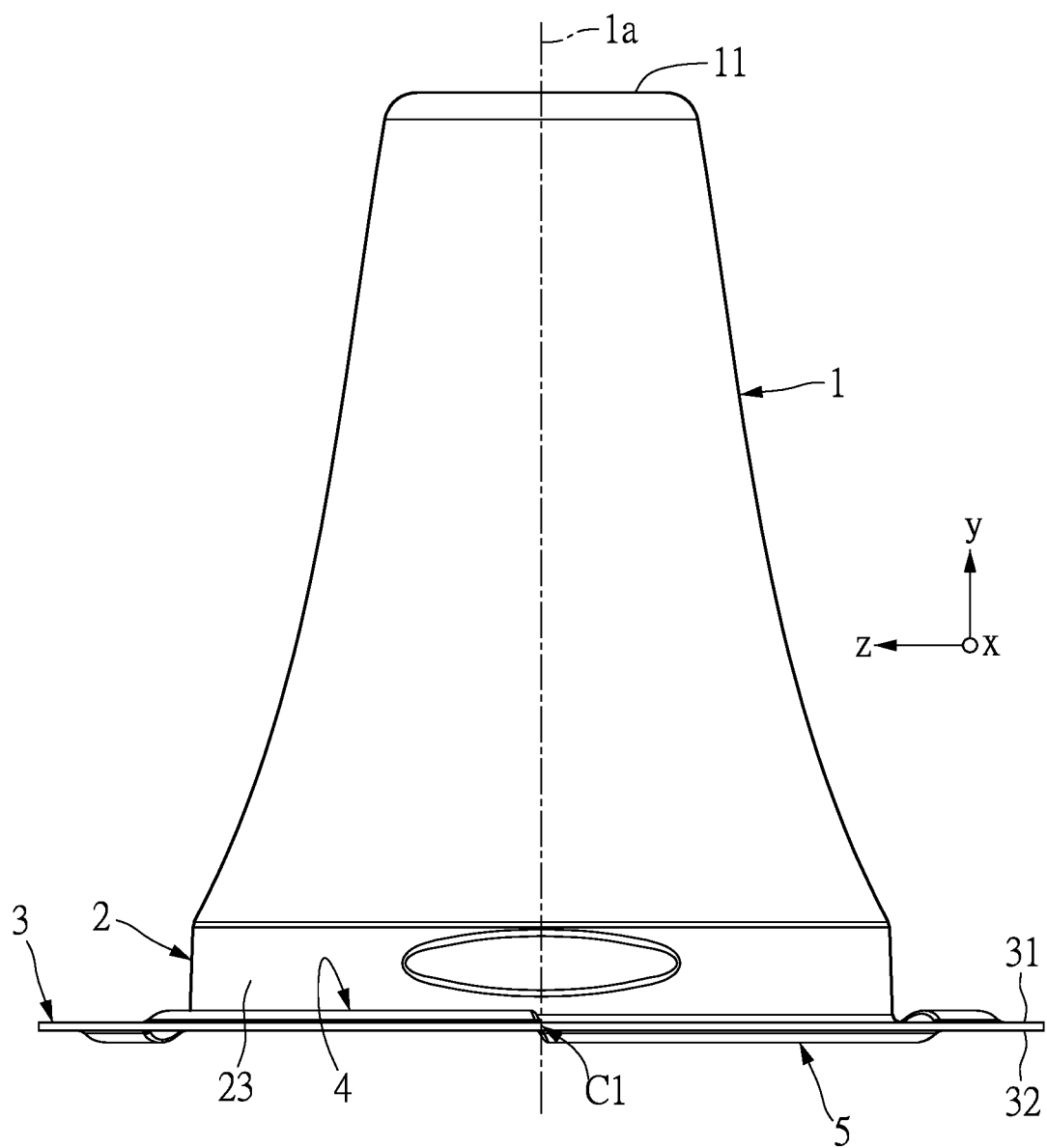
FIG. 5 is a side view of the probe cover for an ear thermometer according to the first embodiment of the present disclosure.

Next, referring to FIG. 3 to FIG. 5, FIG. 3 and FIG. 4 are schematic views of the probe cover for the ear thermometer according to the first embodiment of the present disclosure, and FIG. 5 is a side view of the probe cover for the ear thermometer according to the first embodiment of the present disclosure. The specific structural features of the probe cover U in this embodiment of the present disclosure will be further illustrated as follows. More specifically, the probe cover U for the ear thermometer T of the present disclosure may further include a conical main body 1, an annular elastomer 2, a flange 3, and a plurality of convex rib structures 4. The conical main body 1 is a hollow structure, and has a closed end 11 and an open end 12 corresponding to the closed end 11. The diameter of the conical main body 1 can be gradually shortened from the open end 12 to the closed end 11. The conical main body 1 is defined as having a central axis 1a, which may extend along a long axis direction (direction y) of the conical main body 1. In addition, the material of the conical main body 1 can be plastic (such as but not limited to polyethylene (PE) or polypropylene (PP)) and has the property of being penetrable by infrared rays, so that infrared light can pass through the closed end 11 of the conical main body 1.

Figure 6:
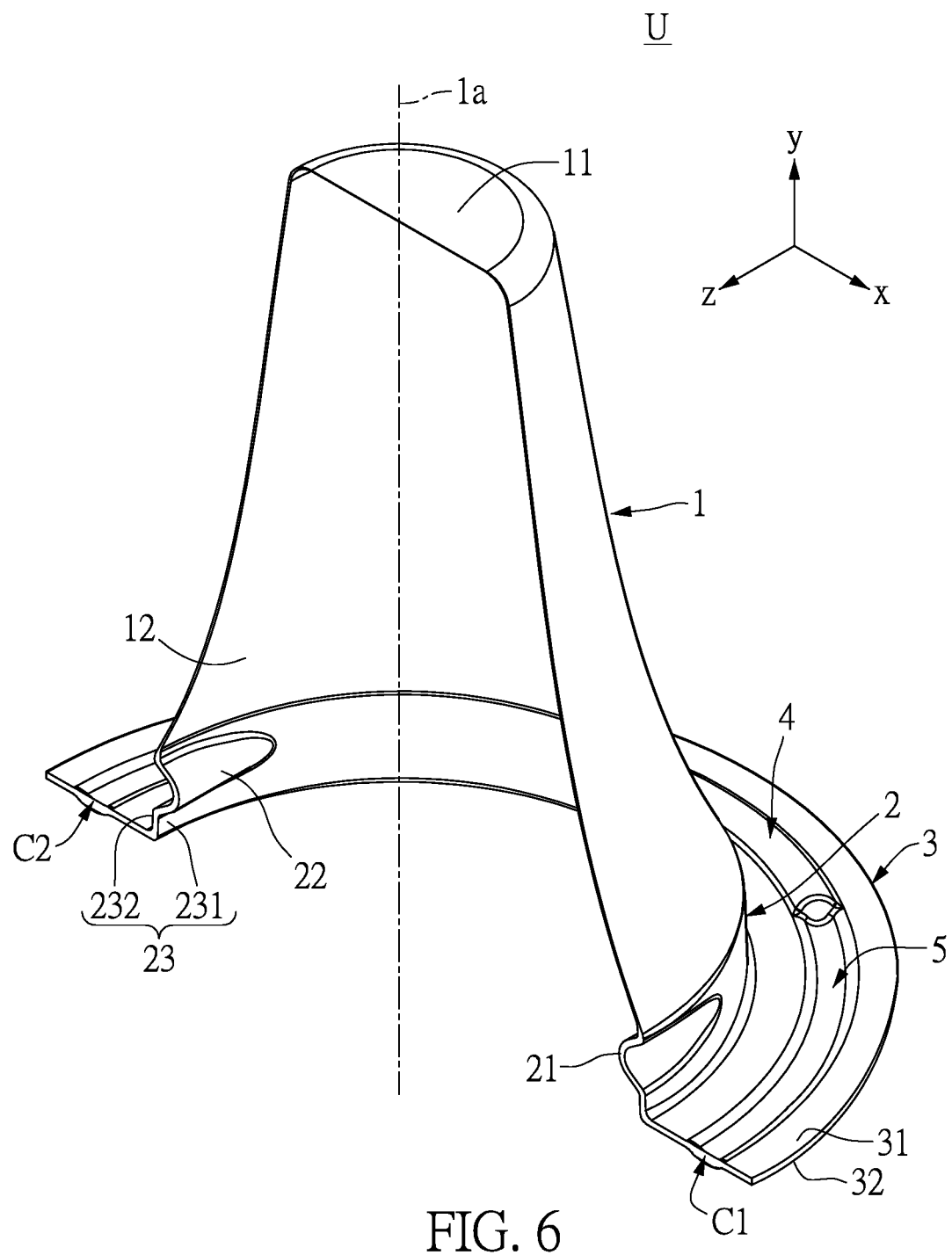
FIG. 6 is a sectional view of the probe cover for an ear thermometer according to the first embodiment of the present disclosure.
Figure 7:
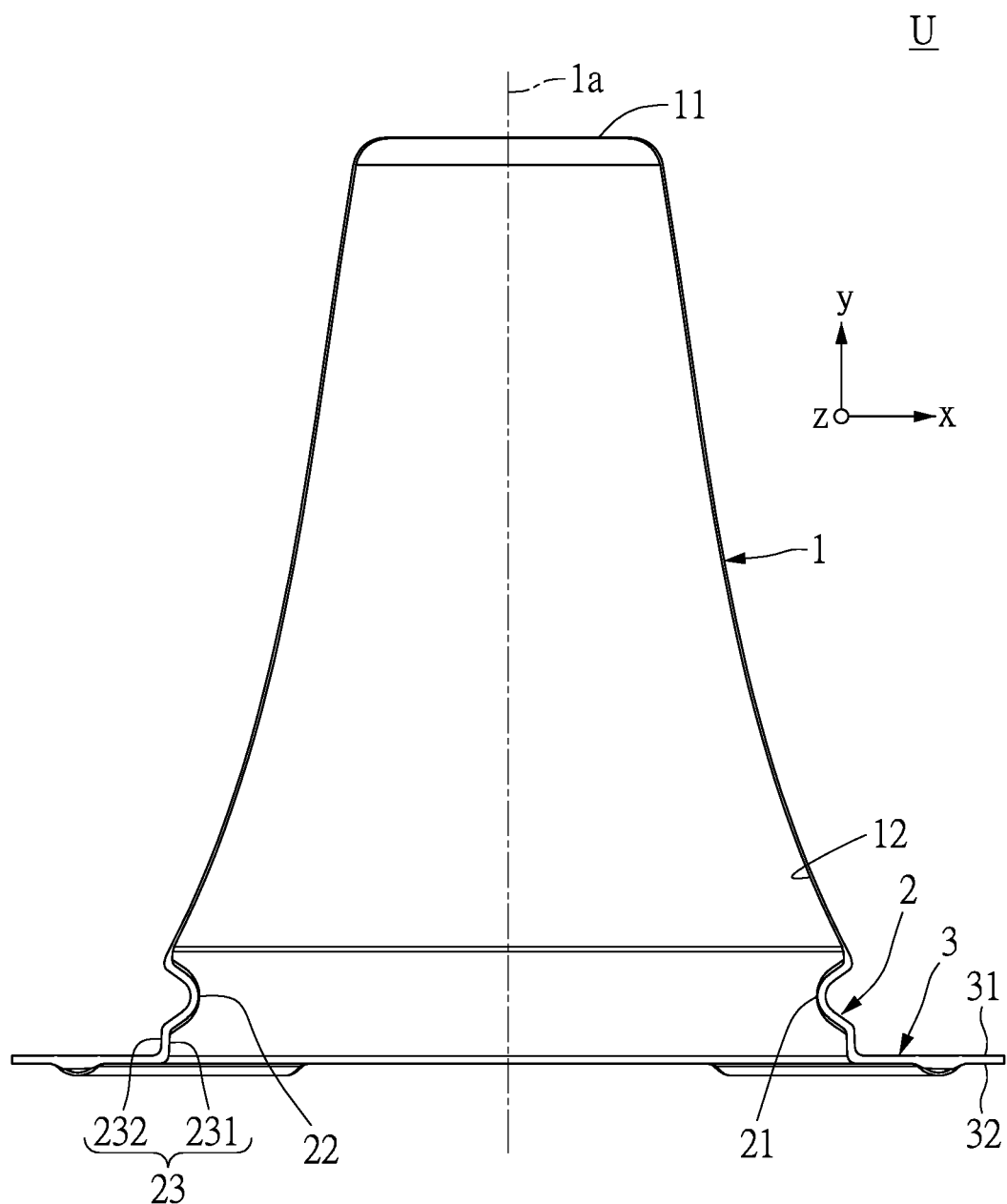
FIG. 7 is a sectional side view taken along line VII-VII in FIG. 3.

Further referring to FIG. 3 to FIG. 5 to be read in conjunction with FIGS. 6 and 7, FIG. 6 is a sectional view of the probe cover for an ear thermometer according to the first embodiment of the present disclosure, and FIG. 7 is a sectional side view taken along line VII-VII in FIG. 3. The annular elastomer 2 can be connected to the open end 12 of the conical main body 1. In this embodiment, the annular elastomer 2 includes a first propping portion 21, a second propping portion 22 opposite to the first propping portion 21, and a ring portion 23 connected with the first propping portion 21 and the second propping portion 22. The ring portion 23 can include an inner surface 231 and an outer surface 232 opposite to the inner surface 231. The first propping portion 21 and the second propping portion 22 respectively protrude upwardly from the inner surface 231 of the annular elastomer 2, while the first propping portion 21 and the second propping portion 22 are respectively recessed from the outer surface 232 of the annular elastomer 2. Therefore, the first propping portion 21 and the second propping portion 22 can respectively extend in the direction of the central axis 1a to be two recessed propping portions on the probe cover U. It should be noted that, although this embodiment of the present disclosure is exemplified with two propping portions (the first propping portion 21 and the second propping portion 22), in other embodiments, the number of propping portions can be more than two, but is not limited thereto. However, the number of propping portions should not be too many, since it may be difficult for the user to separate the probe cover U from the probe T2 with excessive propping portions.

Further referring to FIG. 3 to FIG. 7, the flange 3 can connect to the annular elastomer 2, and the annular elastomer 2 can be disposed between the conical main body 1 and the flange 3. Further, the flange 3 may have a first surface 31 and a second surface 32 opposite to the first surface 31, and the flange 3 can extend radially outward from the central axis 1a of the conical main body 1. For instance, the extending direction of the flange 3 (direction x and/or direction z, the x-z plane) may be roughly perpendicular to the direction of long axis (direction y).

Figure 8:
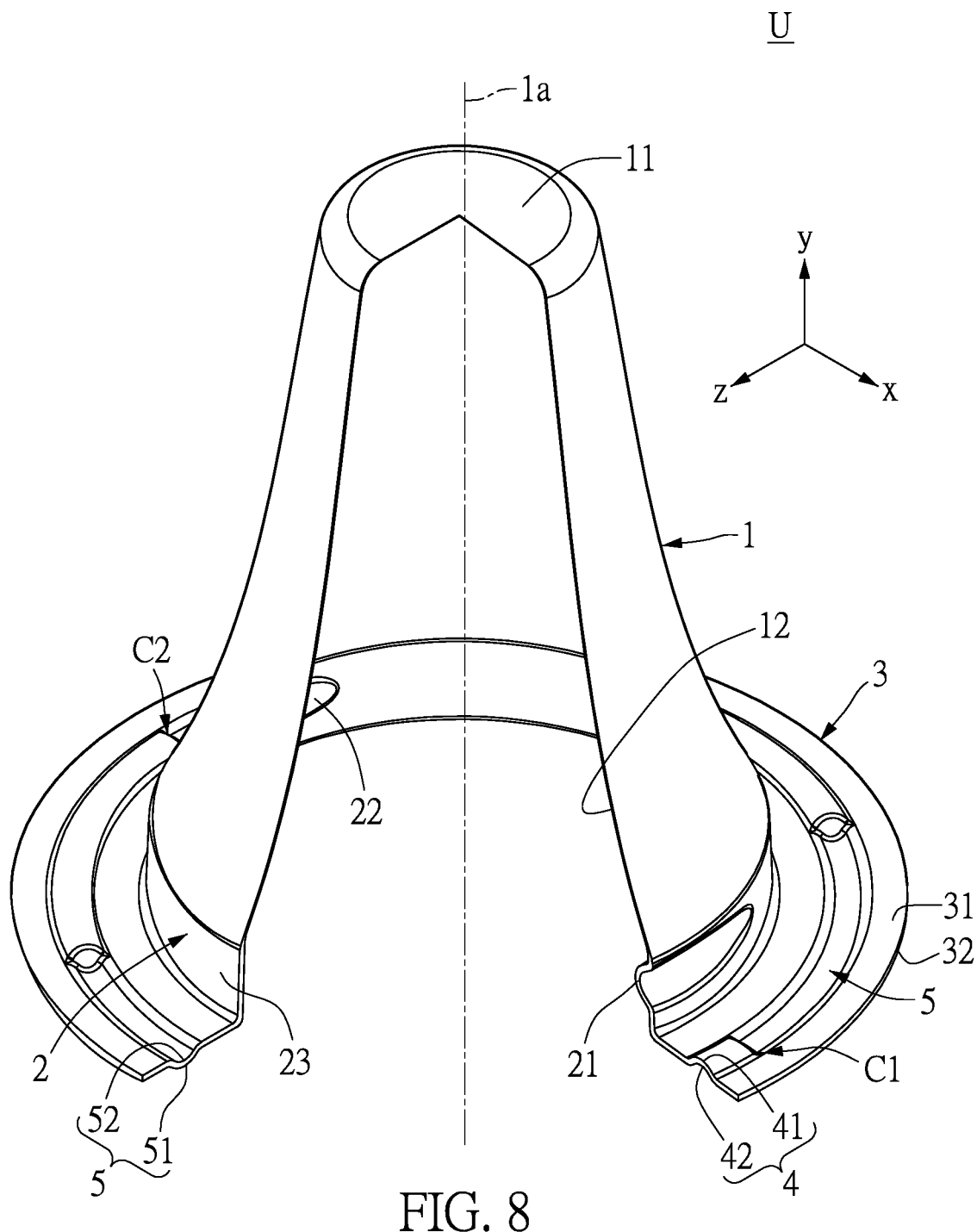
FIG. 8 is another sectional view of the probe cover for an ear thermometer according to the first embodiment of the present disclosure.

Referring to FIG. 8, which are to be read in conjunction with FIGS. 3 to 7, FIG. 8 is another sectional view of the probe cover for an ear thermometer according to the first embodiment of the present disclosure. The plurality of convex rib structures 4 can be separated from each other, can be spaced apart from each other on the flange 3, and can protrude upwardly from the first surface 31. For example, the convex rib structures 4 can be, but is not limited to being, arc-shaped. In addition, each center of circle of the convex rib structures 4 is located at the central axis 1a. More specifically, each of the convex rib structures 4 has a first convex surface 41 which protrudes upwardly from first surface 31, and a first concave surface 42 which is recessed from the second surface 32. Preferably, the flange 3 and the convex rib structures 4 of the probe cover U may have the same thickness in this embodiment of the present disclosure.

Further referring to FIG. 3 to FIG. 8, preferably, in this embodiment, the probe cover U can further include a plurality of concave rib structures 5. However, in other embodiments, the probe cover U can only include the convex rib structures 4, and thus the present disclosure is not limited to the inclusion of the concave rib structures 5. Furthermore, the concave rib structures 5 can be separated from each other, can be spaced apart on the flange 3, and can be recessed from the first surface 31. For example, the concave rib structures 5 can be, but is not limited to being, arc-shaped. In addition, each center of circle of the concave rib structures 5 is located at the central axis 1a. More specifically, each of the concave rib structures 5 has a second convex surface 51 which protrudes upwardly from first surface 31, and a second concave surface 52 which is recessed from the second surface 32. Preferably, the flange 3 and the concave rib structures 5 of the probe cover U may have the same thickness in this embodiment of present disclosure.

Moreover, referring to FIG. 3 to FIG. 8, one of the concave rib structures 5 can be disposed between two adjacent ones of the convex rib structures 4. Further, as shown in FIG. 4, the convex rib structures 4 and the concave rib structures 5 are alternately connected to each other, so as to form an annular structure (unlabeled in FIG. 4) that is wave-shaped. In addition, the annular structure formed by the convex rib structures 4 and the concave rib structures 5 can be a circular structure surrounding the conical main body 1; in other words, each of the convex rib structures 4 and each of the concave rib structures 5 may being alternately connected to each other and arranged at intervals, so that each of the concave rib structures 5 can be arranged between two adjacent ones of the convex rib structures 4, and each of the convex rib structures 4 can be arranged between two adjacent ones of the concave rib structures 5. In addition, the convex rib structures 4 and the concave rib structures 5 can be arc-shaped, and center of circles of the convex rib structures 4 and the concave rib structures 5 are co-located, so that the annular structure that is wave-shaped can be formed. Therefore, the strength of the probe cover U can be improved by the convex rib structures 4 and the concave rib structures 5, so that a user can easily engage the probe cover U onto the probe T2 of the ear thermometer T or detach the probe cover U from the probe T2.

It should be noted that, according to the present disclosure, the conical main body 1, the annular elastomer 2, the flange 3, the convex rib structures 4, and concave rib structures 5 can be integrally molded, for instance, by a vacuum forming process, but is not limited thereto. More specifically, since the first propping portion 21 and the second propping portion 22 are respectively recessed from the outer surface 232 of the annular elastomer 2, the overall process yield can be improved during the demolding step of the manufacturing process. It is worth mentioning that, the convex rib structures 4 and/or the concave rib structures 5 can be a semicircular structure, but is not limited thereto. The convex rib structures 4 may be protruded in a first direction (positive direction y), while the concave rib structures 5 may be protruded in a second direction (negative direction y), and the first direction and second direction are in opposite directions.

Further referring to FIG. 3 to FIG. 8, preferably, one of the convex rib structures 4 and one of the concave rib structures 5 can connected to each other, so as to form a first connecting end C1 between the convex rib structures 4, and the concave rib structures 5 correspond to the first propping portion 21. In other words, as shown in FIG. 5, the first connecting end C1 can be disposed at the middle of the first propping portion 21 to make the first propping portion 21 simultaneously correspond to the convex rib structures 4 and the concave rib structures 5. Furthermore, another one of the convex rib structures 4 and another one of the concave rib structures 5 can be connected to each other, so as to form a second connecting end C2 between the convex rib structures 4, and the concave rib structures 5 correspond to the second propping portion 22. In other words, the second connecting end C2 can be disposed at the middle of the second propping portion 22 to make the second propping portion 22 simultaneously correspond to the convex rib structures 4 and the concave rib structures 5. It is worth mentioning that, the first propping portion 21 and/or the second propping portion 22 can be a beveled surface, but is not limited thereto.

It should be noted that, although this embodiment of the present disclosure is exemplified with three convex rib structures 4 and three concave rib structures 5, in other embodiments, the number of the convex rib structures 4 and concave rib structures 5 can be more than three, but is not limited thereto. For instance, the present disclosure may include four convex rib structures 4 with four concave rib structures 5, five convex rib structures 4 with five concave rib structures 5, or six convex rib structures 4 with six concave rib structures 5, but is not limited thereto.

Figure 9:
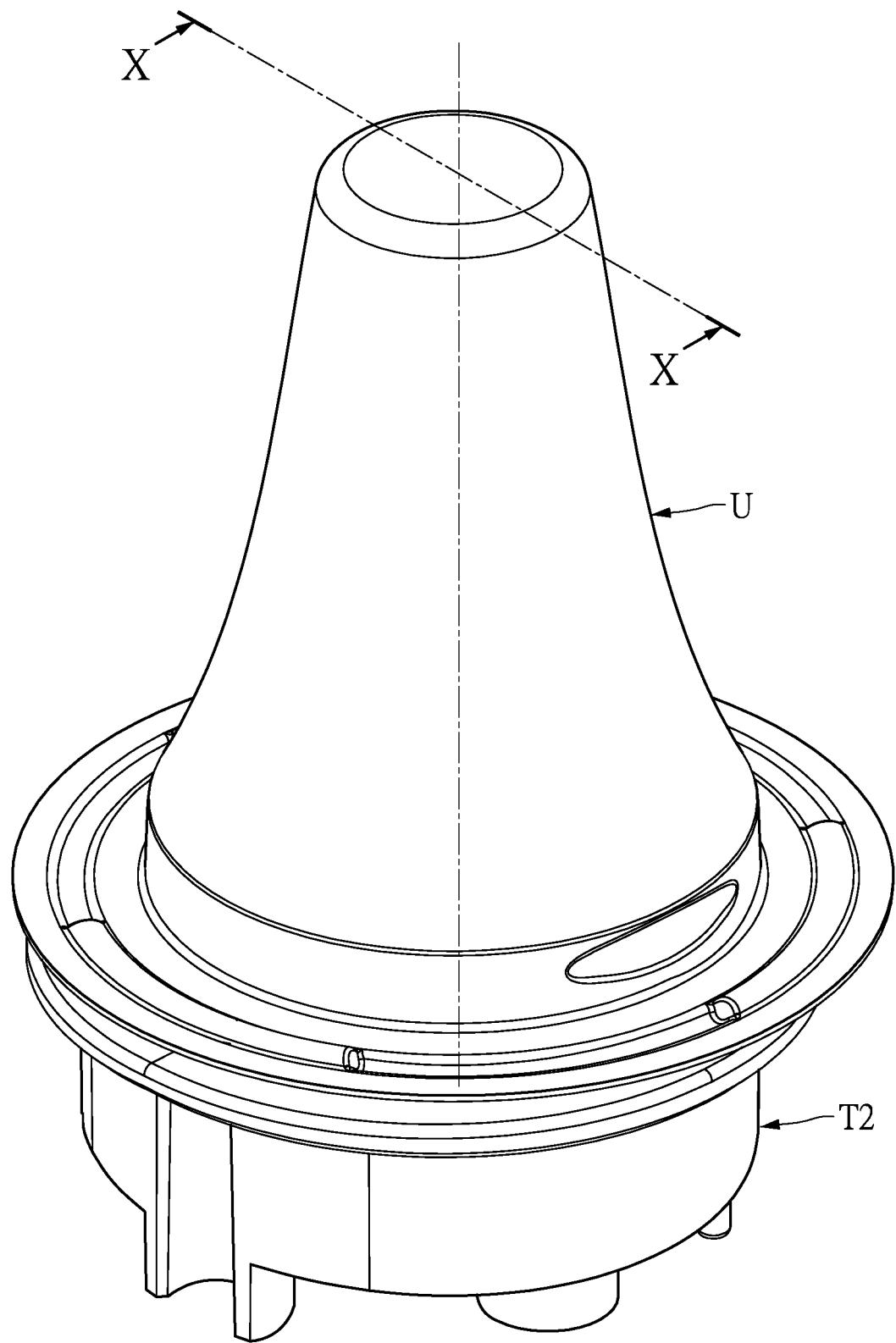
FIG. 9 is a schematic assembled view of the probe cover for an ear thermometer and the probe of the ear thermometer according to the first embodiment of the present disclosure.
Figure 10:
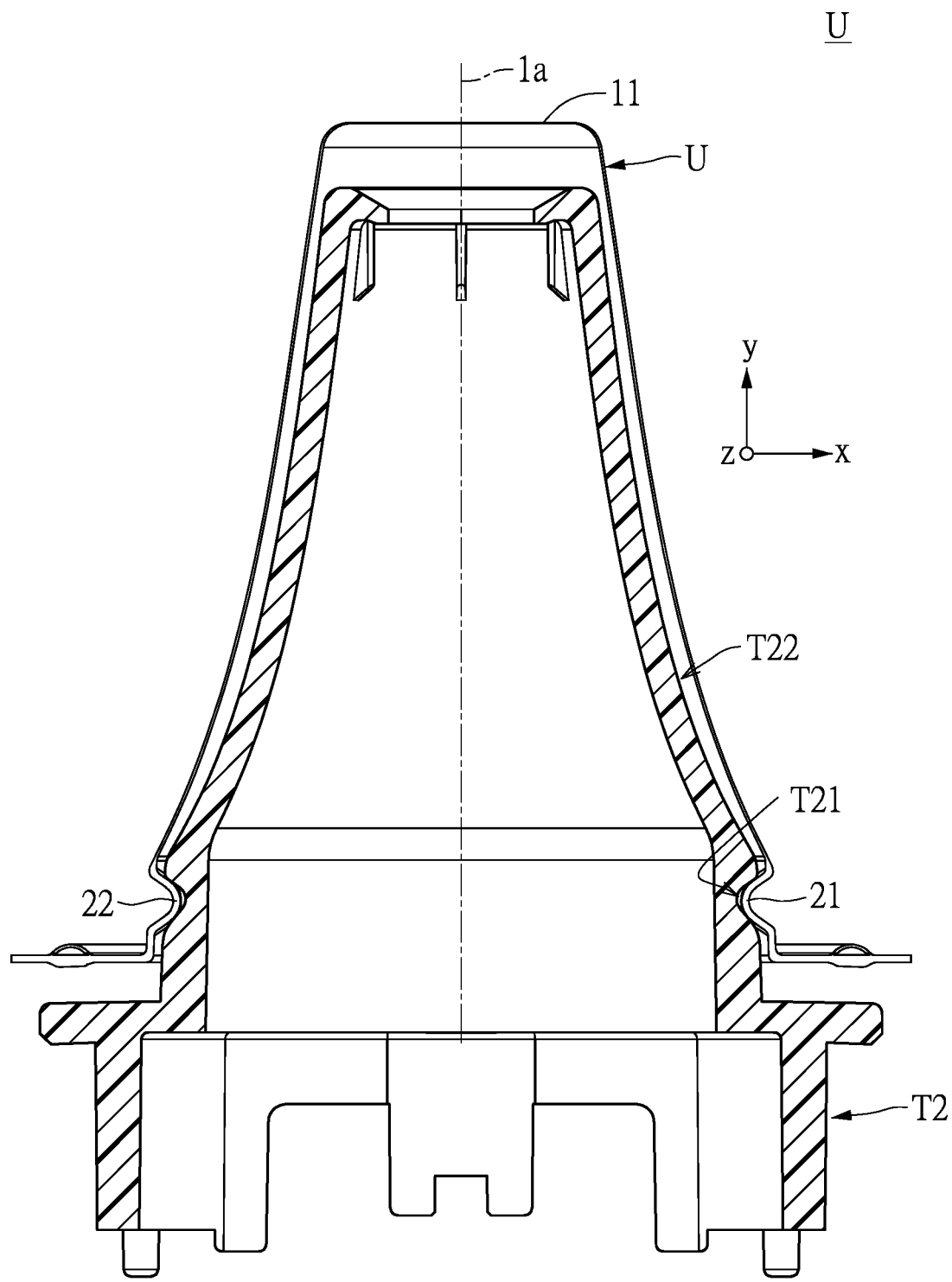
FIG. 10 is a sectional side view taken along line X-X in FIG. 9.

Next, referring to FIG. 9 to FIG. 10, which are to be read in conjunction with FIGS. 3 to 8, FIG. 9 is a schematic assembled view of the probe cover for an ear thermometer and the probe of the ear thermometer according to the first embodiment of the present disclosure, and FIG. 10 is a sectional side view taken along line X-X in FIG. 9. The fastening relationship between the probe cover U and the probe T2 of the ear thermometer T provided in this embodiment of the present invention will be further described as follows. More specifically, since the first propping portion 21 and the second propping portion 22 can correspond to the two propping portions of the probe cover U, which are recessed on the probe cover U, the first propping portion 21 and the second propping portion 22 can engage with the groove T22 of the probe T2 to be fastened, and the groove T22 may be surroundingly disposed on the external surface 22 of the probe T2.

Second Embodiment

Figure 11:
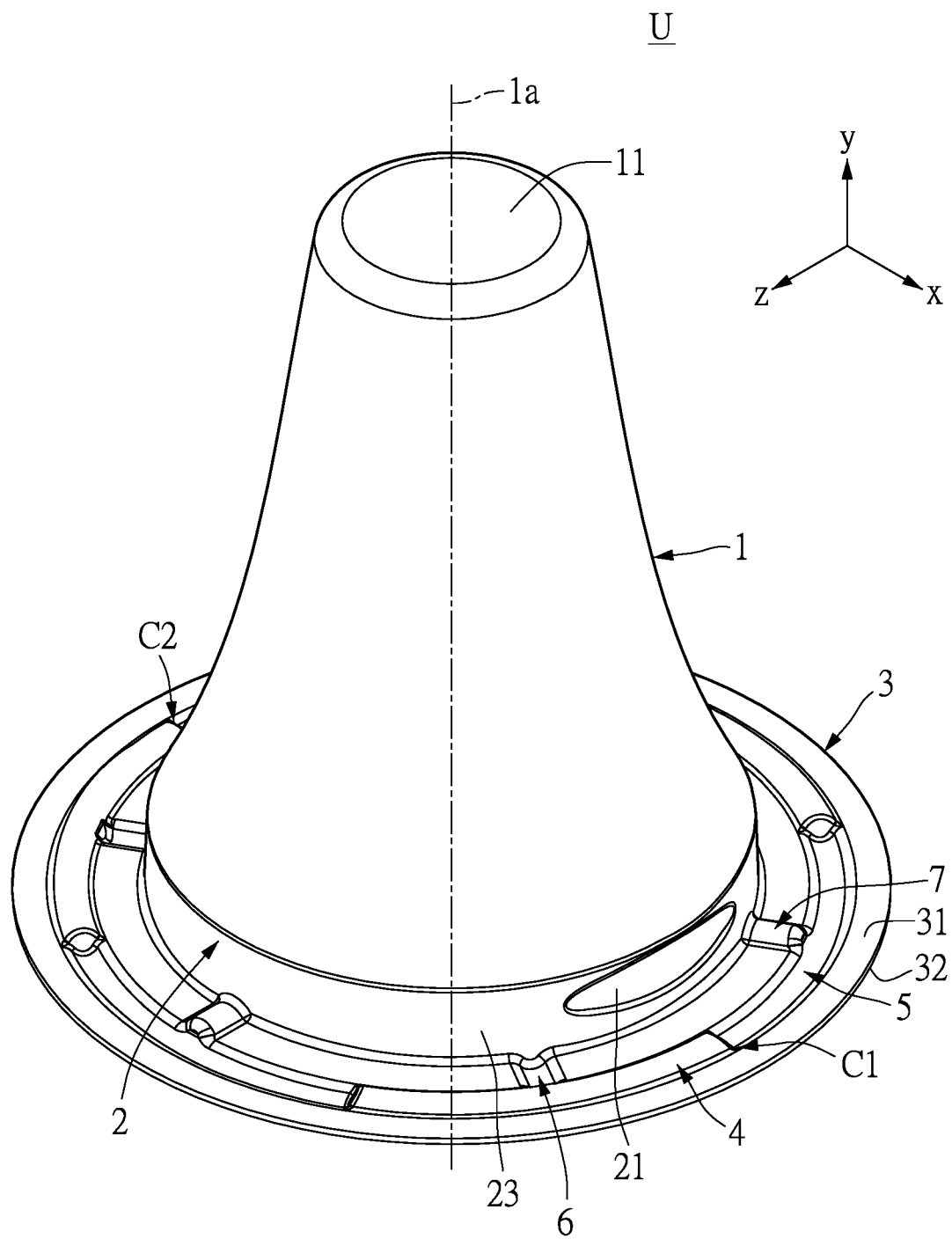
FIG. 11 is a schematic view of the probe cover for an ear thermometer according to a second embodiment of the present disclosure.
Figure 12:
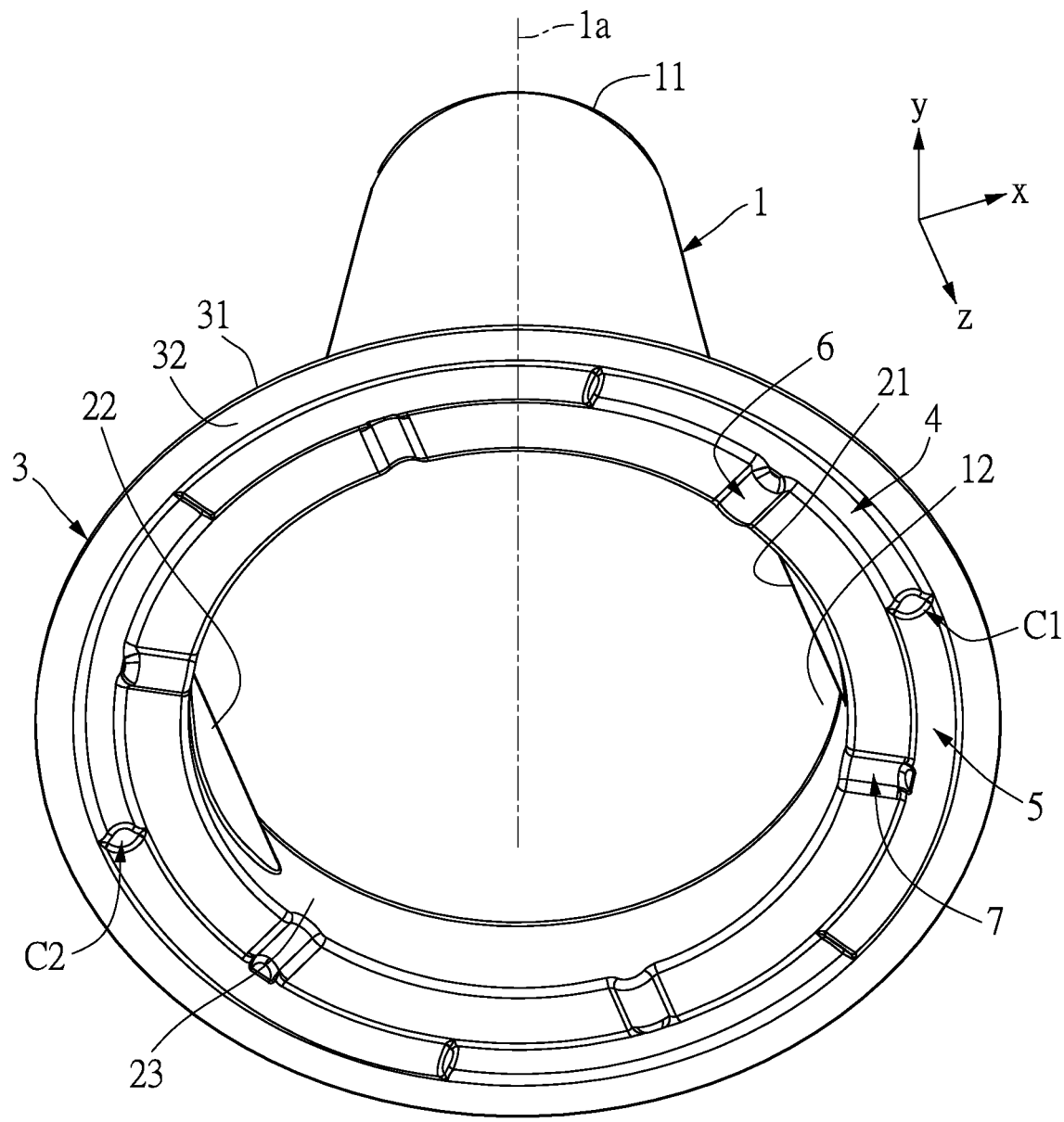
FIG. 12 is another schematic view of the probe cover for an ear thermometer according to the second embodiment of the present disclosure.
Figure 13:
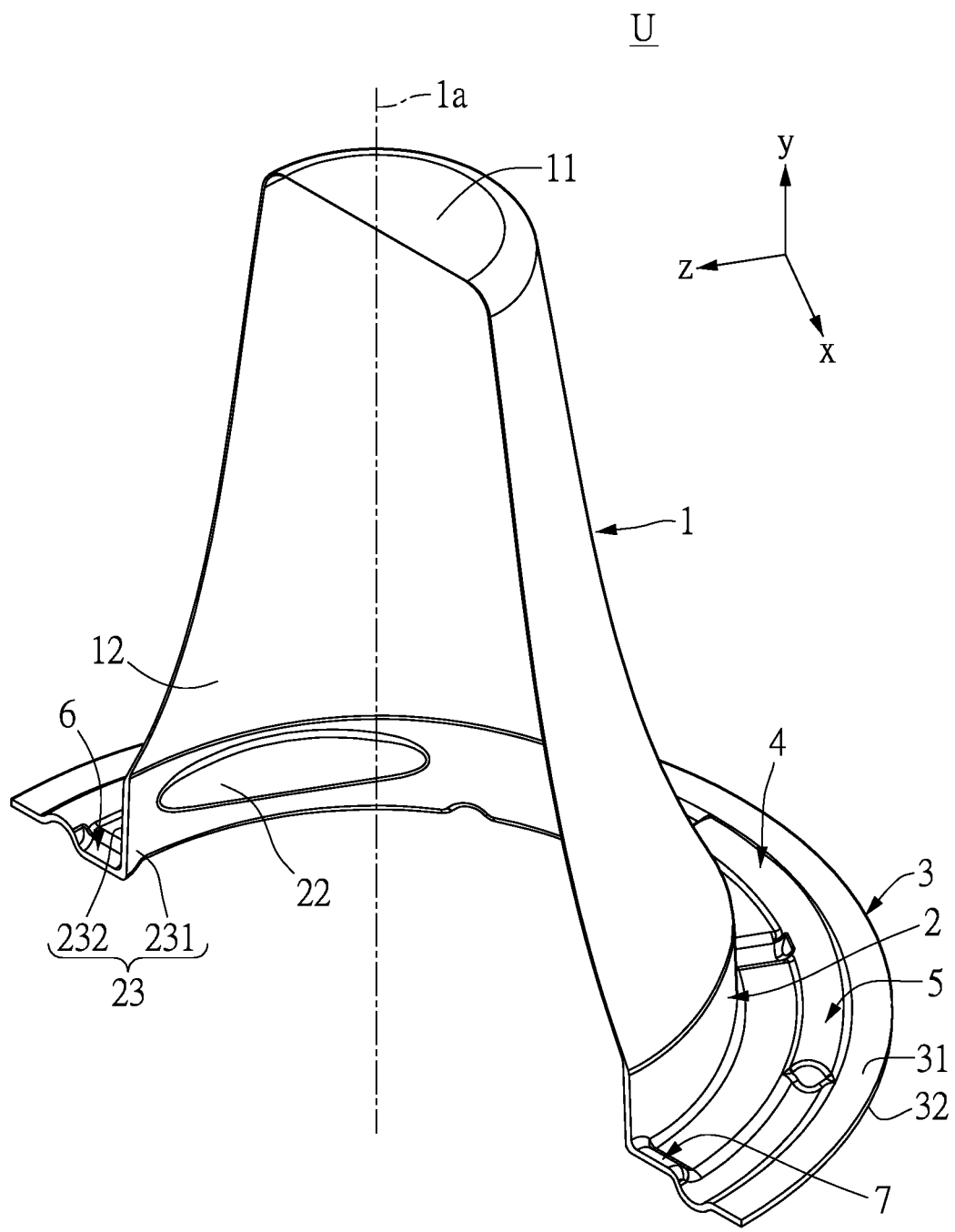
FIG. 13 is a sectional view of the probe cover for an ear thermometer according to the second embodiment of the present disclosure.

Referring to FIG. 11 to FIG. 13, FIG. 11 and FIG. 12 are schematic views of the probe cover for an ear thermometer according to a second embodiment of the present disclosure, and FIG. 13 is a sectional view of the probe cover for an ear thermometer according to the second embodiment of the present disclosure. Compared with FIG. 11 and FIG. 3, the difference between the two embodiments is that the probe cover U for the ear thermometer T in the second embodiment further includes a plurality of first auxiliary rib structures 6 and/or a plurality of second auxiliary rib structures 7. In addition, the first auxiliary rib structures 6 and the second auxiliary rib structures 7 may be selectively disposed on the probe cover U so that the probe cover U may include only the first auxiliary rib structures 6, only the second auxiliary rib structures 7, or both the first auxiliary rib structures 6 and the second auxiliary rib structures 7, and is not limited thereto. Further, the other structural features of the probe cover U for the ear thermometer T in the second embodiment are similar with those in the first embodiment, and will not be repeated herein.

Further referring to FIG. 11 to FIG. 13, the first auxiliary rib structures 6 can be disposed on the flange 3 and be respectively arranged between each of the convex rib structures 4 and the annular elastomer 2. In addition, the first auxiliary rib structures 6 can extend radially outward from the central axis 1a of the conical main body 1. Preferably, each of the first auxiliary rib structures 6 is recessed from the first surface 31 of the flange 3, but is not limited thereto.

Further referring to FIG. 11 to FIG. 13, the second auxiliary rib structures 7 can be disposed on the flange 3 and be respectively arranged between each of the concave rib structures 5 and the annular elastomer 2. In addition, the second auxiliary rib structures 7 can extend radially outward from the central axis 1a of the conical main body 1. Preferably, each of the second auxiliary rib structures 7 protrudes upwardly from the first surface 31 of the flange 3, but is not limited thereto. More specifically, according to FIG. 11 to FIG. 13, the convex rib structures 4 can connect with the first auxiliary rib structures 6 that are recessed, while the concave rib structures 5 can connect with the second auxiliary rib structures 7 that protrude protrudes upwardly from the first surface 31, but is not limited thereto.

Further referring to FIG. 11 to FIG. 13, the first propping portion 21 is disposed between one of the first auxiliary rib structures 6 and one of the second auxiliary rib structures 7, while the second propping portion 22 is disposed between another one of the first auxiliary rib structures 6 and another one of the second auxiliary rib structures 7. Furthermore, the first connecting end C1 is disposed between one of the first auxiliary rib structures 6 and one of the second auxiliary rib structures 7, while the second connecting end C2 is disposed between another one of the first auxiliary rib structures 6 and another one of the second auxiliary rib structures 7. Therefore, the positions adjacent to the first propping portion 21 and the second propping portion 22 can be strengthened, so that a user can easily engage the probe cover U onto the probe T2 of the ear thermometer T or detach the probe cover U from the probe T2. It is worth mentioning that, the first auxiliary rib structures 6 and/or the second auxiliary rib structures 7 can be a semicircular structure, but is not limited thereto.

Figure 14:
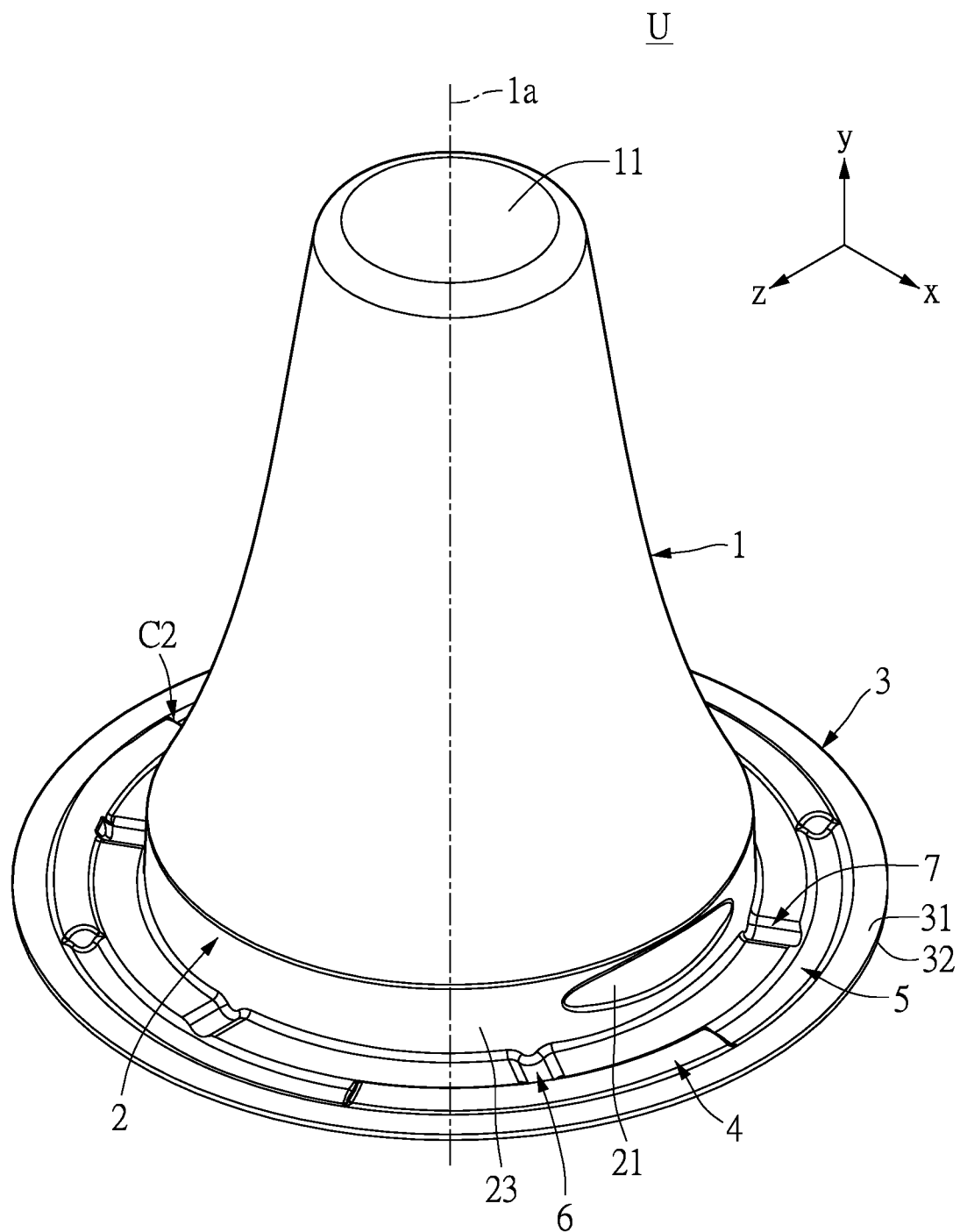
FIG. 14 is yet another schematic view of the probe cover for an ear thermometer according to the second embodiment of the present disclosure.

Next, referring to FIG. 14, which is to be read in conjunction with FIG. 1, FIG. 14 is yet another schematic view of the probe cover for an ear thermometer according to the second embodiment of the present disclosure. As can be seen from a comparison between FIG. 14 and FIG. 11, in the illustration of FIG. 14, each of the second auxiliary rib structures 7 can be recessed from first surface 31. Therefore, when the user engages the probe cover U to the probe T2, the second surface 32 of the flange 3 of the probe cover U can be abutted against the detecting element T3, or the first auxiliary rib structures 6 and/or the second auxiliary rib structures 7 can be abutted against the detecting element T3.

Third Embodiment

Figure 15:
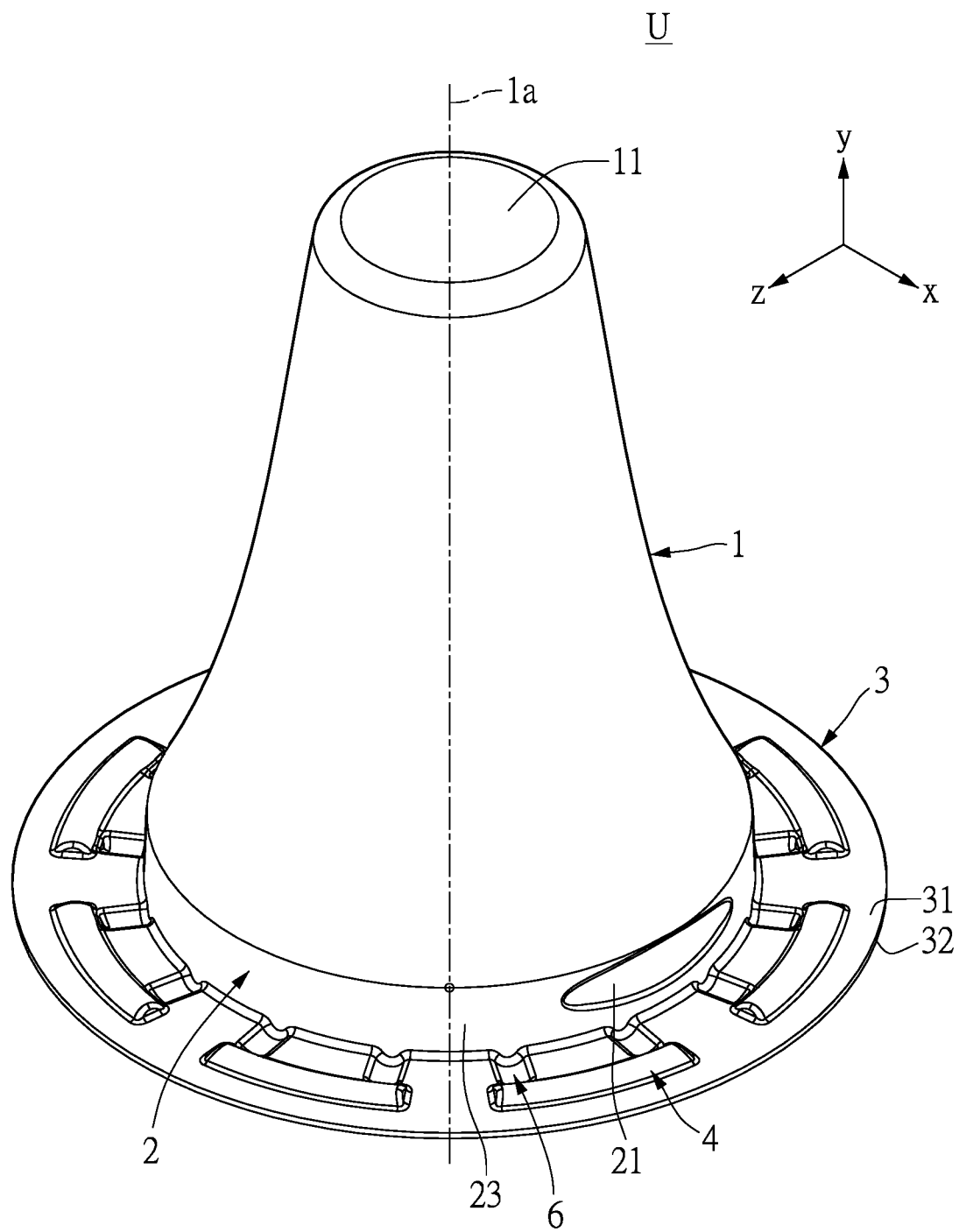
FIG. 15 is a schematic view of the probe cover for an ear thermometer according to a third embodiment of the present disclosure.
Figure 16:
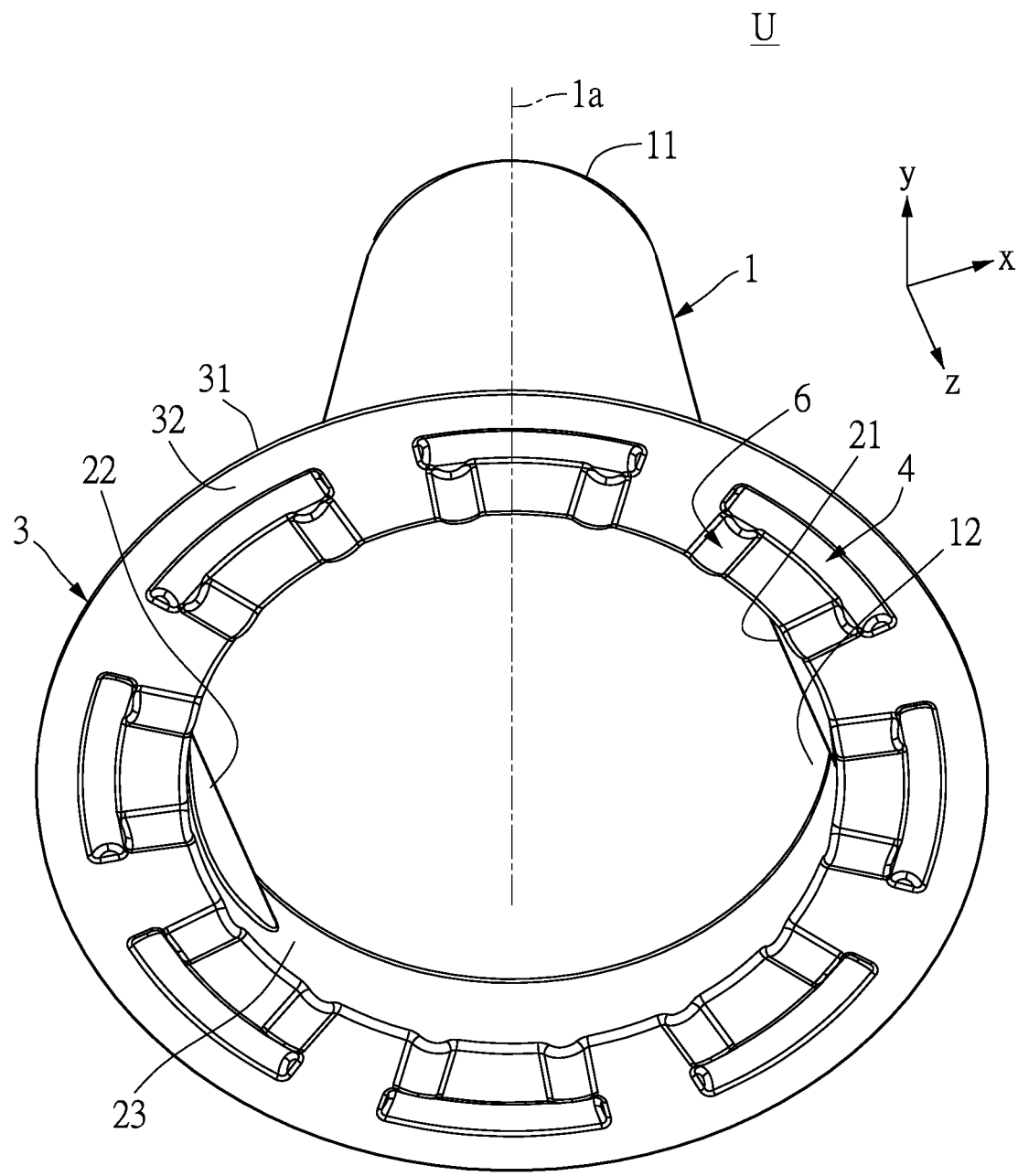
FIG. 16 is another schematic view of the probe cover for an ear thermometer according to the third embodiment of the present disclosure.
Figure 17:
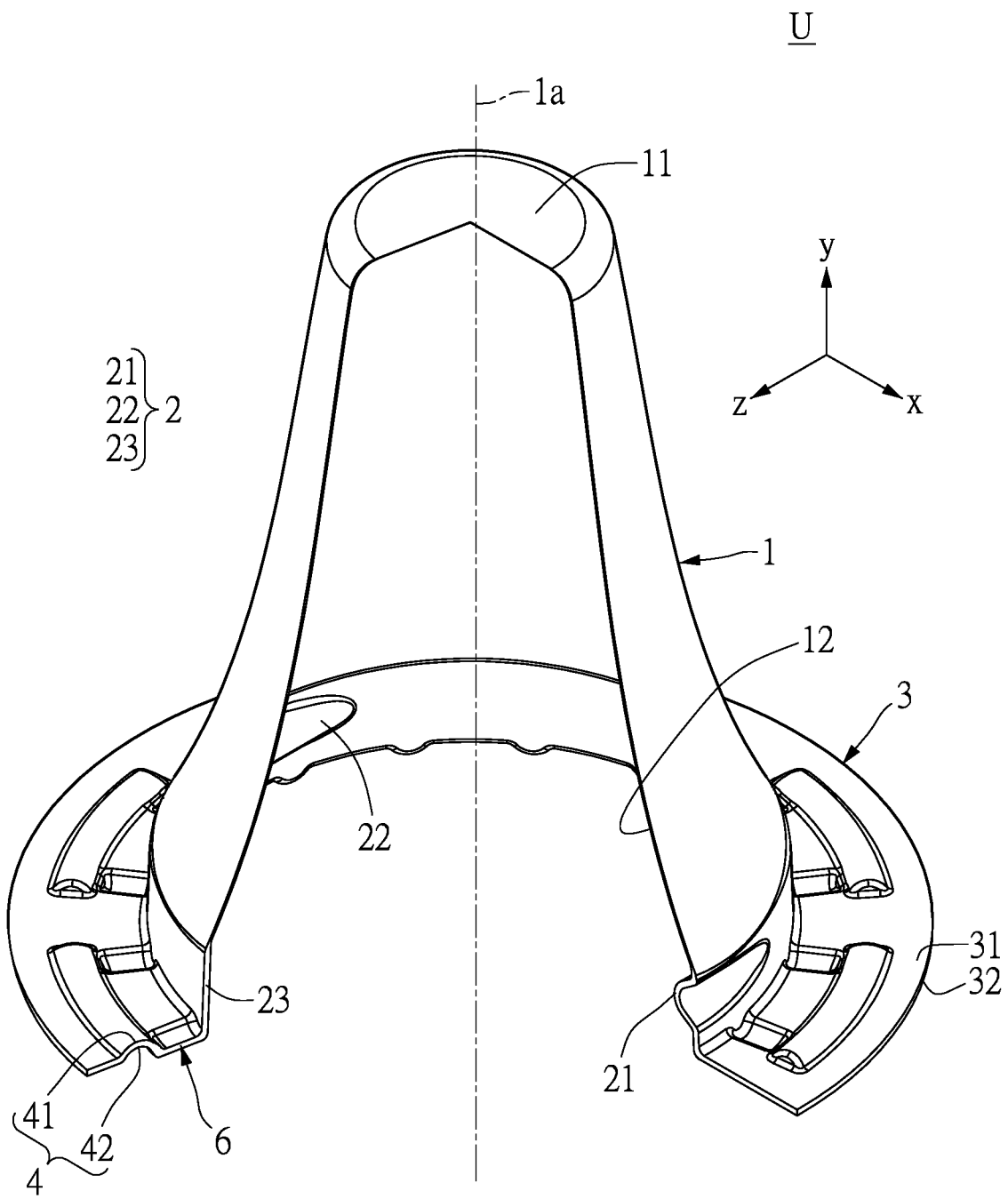
FIG. 17 is a sectional view of the probe cover for an ear thermometer according to the third embodiment of the present disclosure.

Referring to FIG. 15 to FIG. 17, FIG. 15 and FIG. 16 are schematic views of the probe cover for an ear thermometer according to a third embodiment of the present disclosure, and FIG. 17 is a sectional view of the probe cover for an ear thermometer according to the third embodiment of the present disclosure. Compared with FIG. 15 and FIG. 11, the difference between the second embodiment and the third embodiment is that the probe cover U for the ear thermometer T in the third embodiment may include a conical main body 1, an annular elastomer 2, a flange 3, a plurality of convex rib structures 4, and a plurality of first auxiliary rib structures 6. The first auxiliary rib structures 6 can be disposed on the flange 3 and at least two of the first auxiliary rib structures 6 are disposed between each of the convex rib structures 4 and the annular elastomer 2. In other words, each of the convex rib structures 4 can connect with two of the first auxiliary rib structures 6. Further, the other structural features of the probe cover U for the ear thermometer T in the third embodiment are similar with those in the embodiments described above, and will not be repeated herein.

Further referring to FIG. 15 to FIG. 17, the first auxiliary rib structures 6 may be recessed from the first surface 31 of the flange 3 to strengthen the convex rib structures 4 by connecting to the first auxiliary rib structures 6. Further, the first propping portion 21 can be disposed between one of the convex rib structures 4 and another one of the convex rib structures 4, while the second propping portion 22 can be disposed between yet another one of the convex rib structures 4 and still another one of the convex rib structures 4, so that the user can easily engage the probe cover U onto the probe T2 of the ear thermometer T or detach the probe cover U from the probe T2. In addition, the probe cover U in the third embodiment includes eight convex rib structures 4 that are spaced apart from each other, but is not limited thereto.

Figure 18:
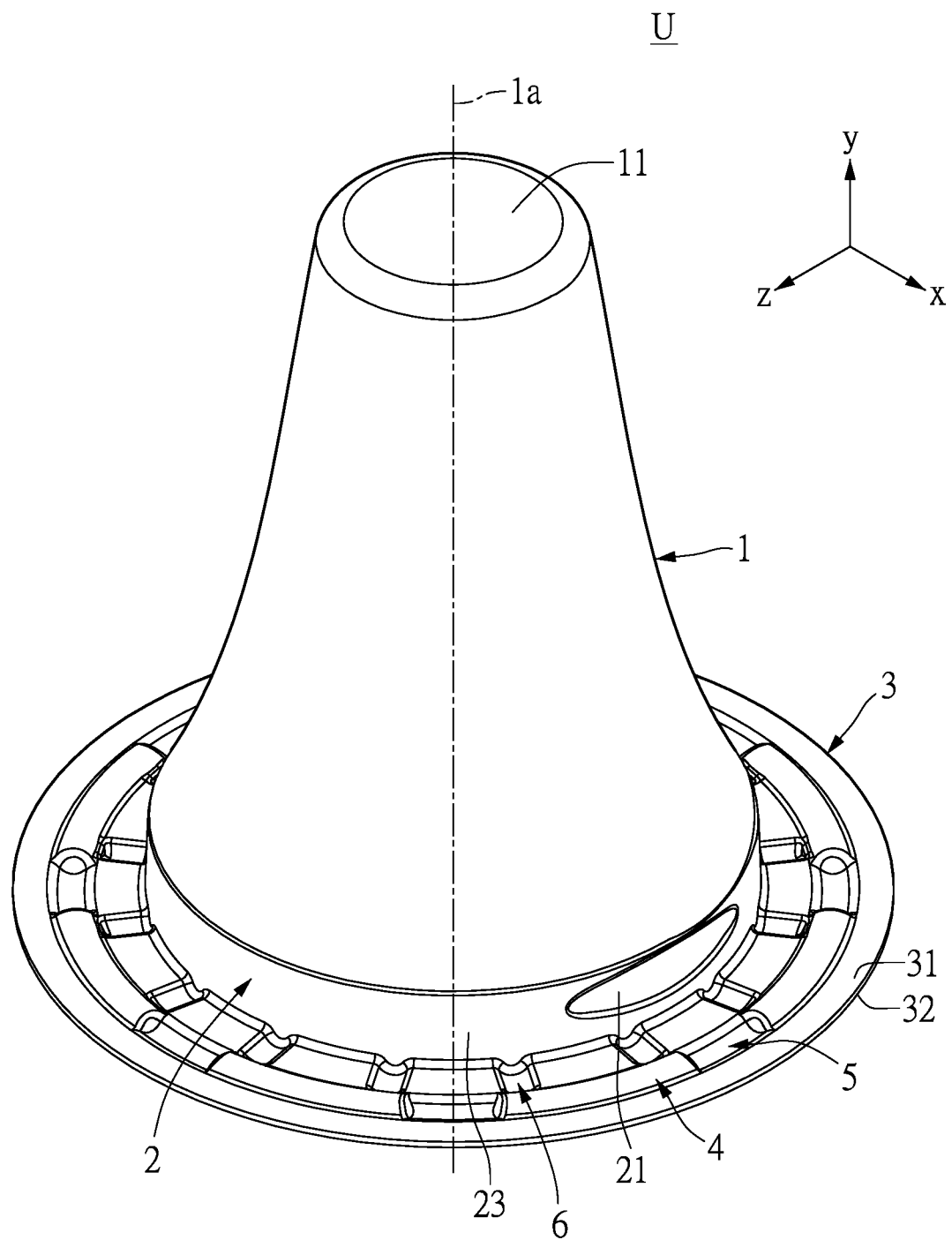
FIG. 18 is yet another schematic view of the probe cover for an ear thermometer according to the third embodiment of the present disclosure.
Figure 19:
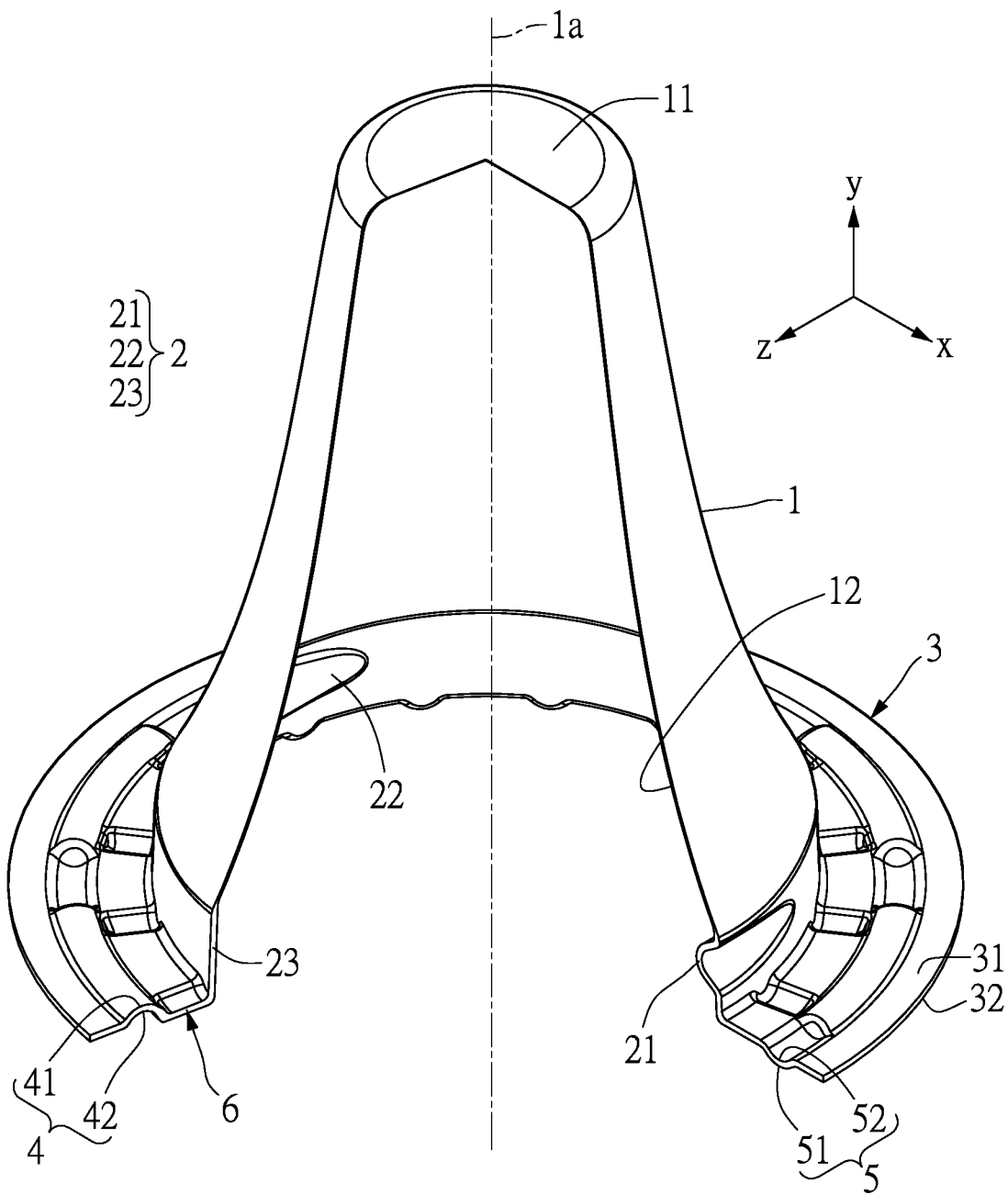
FIG. 19 is another sectional view of the probe cover for an ear thermometer according to the third embodiment of the present disclosure.

Next, referring to FIG. 18 and FIG. 19, FIG. 18 is yet another schematic view of the probe cover for an ear thermometer according to the third embodiment of the present disclosure, and FIG. 19 is another sectional view of the probe cover for an ear thermometer according to the third embodiment of the present disclosure.

As can be seen from a comparison between FIG. 18 and FIG. 15, in the illustration of FIG. 18, the probe cover U can further include a plurality of concave rib structures 5 spaced apart from each other on the flange 3 and being recessed from the first surface 31. The concave rib structures 5 can be arc-shaped, and each center of circle of the concave rib structures 5 is located at the central axis 1a. Further, one of the concave rib structures 5 can be disposed between two adjacent ones of the convex rib structures 4. In other words, each of the concave rib structures 5 can be arranged between two adjacent ones of the convex rib structures 4, and each of the convex rib structures 4 can be arranged between two adjacent ones of the concave rib structures 5.

In conclusion, one of the advantages of the probe cover U for the ear thermometer T of the present disclosure is that, by matching the features of "the convex rib structures 4 are disposed on the flange 3 and spaced apart from each other and protrude upwardly from the first surface 31", the strength of the probe cover U can be improved to be easily engaged onto the probe T2 of the ear thermometer T or be detached from the probe T2 by the user.

Furthermore, by matching the features of "the convex rib structures 4 are disposed on the flange 3 at a distance from each other and protrude upwardly from the first surface 31" and "the concave rib structures 5 are disposed on the flange 3 and spaced apart from each other and are recessed from the first surface 31," the probe cover U can be further strengthened. In addition, the convex rib structures 4 and the concave rib structures 5 are alternately connected to each other to form an annular structure that is wave-shaped, so that the probe cover U can be further strengthened.

Furthermore, by the inclusion of the first auxiliary rib structures 6 and/or the second auxiliary rib structures 7, the strength of the probe cover U can be improved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A probe cover for an ear thermometer, comprising:
a conical main body including a closed end and an open end;
an annular elastomer connected to the open end of the conical main body;
a flange connected to the annular elastomer, wherein the annular elastomer is arranged between the conical main body and the flange, and the flange has a first surface and a second surface opposite to the first surface;
a plurality of convex rib structures wherein the convex rib structures are disposed on the flange and spaced apart from each other, and the convex rib structures protrude upwardly from the first surface; and
a plurality of concave rib structures being disposed on the flange and spaced apart from each other, and are recessed from the first surface;
wherein the convex rib structures are protruded in a first direction, and the concave rib structures are protruded in a second direction, and the first direction and second direction are in two opposite directions;
wherein the first direction is a positive direction y, and the second direction is a negative direction y
wherein the positive direction y is an upward direction perpendicular to the first surface toward the closed end of the conical main body, and the negative direction y is a downward direction perpendicular to the first surface.

2. The probe cover for an ear thermometer according to claim 1, wherein each of the convex rib structures has a first convex surface protruding upwardly from first surface, and a first concave surface being recessed from the second surface.

3. The probe cover for an ear thermometer according to claim 1, wherein one of the concave rib structures is disposed between two adjacent ones of the convex rib structures.

4. The probe cover for an ear thermometer according to claim 3, wherein each of the concave rib structures has a second concave surface being recessed from the first surface, and a second convex surface protruding upwardly from the second surface.

5. The probe cover for an ear thermometer according to claim 3, wherein the convex rib structures and the concave rib structures are alternately connected to each other, so as to form an annular structure that is wave-shaped.

6. The probe cover for an ear thermometer according to claim 1, wherein the annular elastomer includes a first propping portion and a second propping portion opposite to the first propping portion, and the first propping portion and the second propping portion are detachably engaged to a groove of a probe of the ear thermometer, wherein the groove surrounds an external surface of the probe.

7. The probe cover for an ear thermometer according to claim 1, wherein the annular elastomer includes a first propping portion, a second propping portion opposite to the first propping portion, and a ring portion connected with the first propping portion and the second propping portion, the ring portion having an inner surface and an outer surface opposite to the inner surface; wherein the first propping portion and the second propping portion respectively protrude upwardly from the inner surface of the ring portion, and the first propping portion and the second propping portion are respectively recessed from the outer surface of the ring portion.

8. The probe cover for an ear thermometer according to claim 7, wherein the concave rib structures are disposed on the flange and spaced apart from each other, and are recessed from the first surface, wherein one of the concave rib structures is disposed between two adjacent ones of the convex rib structures; wherein a first connecting end between one of the convex rib structures and one of the concave rib structures corresponds to the first propping portion;
and wherein a second connecting end between another one of the convex rib structures and another one of the concave rib structures corresponds to the second propping portion.

9. The probe cover for an ear thermometer according to claim 1, wherein the conical main body has a central axis extending along a long axis direction of the conical main body; wherein the convex rib structures are arc-shaped and the center of circle of the convex rib structures is located at the central axis; and wherein the concave rib structures are arc-shaped and each center of circle of the concave rib structures is located at the central axis.

10. The probe cover for an ear thermometer according to claim 1, further comprising a plurality of first auxiliary rib structures, wherein the first auxiliary rib structures are disposed on the flange and respectively arranged between the convex rib structures and the annular elastomer.

11. The probe cover for an ear thermometer according to claim 10, wherein each of the first auxiliary rib structures is recessed from the first surface.

12. The probe cover for an ear thermometer according to claim 10, further comprising a plurality of the concave rib structures and a plurality of second auxiliary rib structures, wherein the concave rib structures are disposed on the flange and spaced apart from each other, and are recessed from the first surface; wherein one of the concave rib structures is disposed between two adjacent ones of the convex rib structures; and
wherein the second auxiliary rib structures are disposed on the flange and spaced apart from each other, and the second auxiliary rib structures are respectively arranged between each of the concave rib structures and the annular elastomer.

13. The probe cover for an ear thermometer according to claim 12, wherein the second auxiliary rib structures are recessed or protrude upwardly from the first surface.

14. The probe cover for an ear thermometer according to claim 12, wherein the annular elastomer includes a first propping portion, a second propping portion being opposite to the first propping portion, and a ring portion connected with the first propping portion and the second propping portion; wherein the first propping portion is arranged between one of the first auxiliary rib structures and one of the second auxiliary rib structures, and the second propping portion is arranged between another one of the first auxiliary rib structures and another one of the second auxiliary rib structures.

15. The probe cover for an ear thermometer according to claim 12, wherein a first connecting end is arranged between one of the convex rib structures and one of the concave rib structures and a second connecting end is arranged between another one of the convex rib structures and another one of the concave rib structures; wherein the first connecting end is arranged between one of the first auxiliary rib structures and one of the second auxiliary rib structures and the second connecting end is arranged between another one of the first auxiliary rib structures and another one of the second auxiliary rib structures.

16. The probe cover for an ear thermometer according to claim 1, further comprising a plurality of first auxiliary rib structures, wherein the first auxiliary rib structures are disposed on the flange and at least two of the first auxiliary rib structures are arranged between each of the convex rib structures and the annular elastomer.

17. The probe cover for an ear thermometer according to claim 16, wherein the concave rib structures are disposed on the flange and spaced apart from each other, and are recessed from the first surface, wherein one of the concave rib structures is disposed between two adjacent ones of the convex rib structures.

18. The probe cover for an ear thermometer according to claim 16, wherein the annular elastomer includes a first propping portion and a second propping portion being opposite to the first propping portion, wherein the first propping portion is arranged between two adjacent ones of the convex rib structures, and the second propping portion is arranged between another two adjacent ones of the convex rib structures.

* * * * *